United States Patent [19]

Seo

[11] Patent Number: 5,758,172

[45] Date of Patent: May 26, 1998

[54] APPARATUS AND METHOD FOR DISPLAYING PMS INFORMATION IN A PORTABLE COMPUTER

[75] Inventor: Seung-Won Seo, Seoul, Rep. of Korea

[73] Assignee: SamSung Electronics Co., Ltd., Suwon, Rep. of Korea

[21] Appl. No.: 581,177

[22] Filed: Dec. 29, 1995

[30] Foreign Application Priority Data

Jan. 20, 1995 [KR] Rep. of Korea .................... 1995/980

[51] Int. Cl.⁶ .................... G06F 13/00; G06F 1/26
[52] U.S. Cl. .................... 395/750.01; 395/750.02; 395/750.03; 395/750.04; 395/750.05; 395/750.06; 395/750.07; 395/750.08
[58] Field of Search .................... 395/750, 800, 395/750.01, 750.02, 750.03, 750.04, 750.05, 750.06, 750.07, 750.08

[56] References Cited

U.S. PATENT DOCUMENTS

| | | | |
|---|---|---|---|
| 4,470,038 | 9/1984 | Amano et al. | 340/365 |
| 5,138,305 | 8/1992 | Tomiyasu | 340/717 |
| 5,218,607 | 6/1993 | Saito et al. | 371/66 |
| 5,230,074 | 7/1993 | Canova, Jr. et al. | 395/750 |
| 5,241,646 | 8/1993 | Arai | 395/500 |
| 5,333,273 | 7/1994 | Raasch et al. | 395/275 |
| 5,339,446 | 8/1994 | Yamasaki et al. | 395/750 |
| 5,341,316 | 8/1994 | Nishigaki | 364/709.12 |
| 5,341,503 | 8/1994 | Gladstein et al. | 395/750 |
| 5,345,392 | 9/1994 | Mito et al. | 364/483 |
| 5,365,221 | 11/1994 | Fennell et al. | 340/636 |
| 5,406,188 | 4/1995 | Myslinski et al. | 320/14 |
| 5,483,464 | 1/1996 | Song | 364/492 |
| 5,546,590 | 8/1996 | Pierce | 395/750 |
| 5,548,765 | 8/1996 | Tsunoda et al. | 395/750 |
| 5,552,802 | 9/1996 | Nonoshita et al. | 345/100 |
| 5,560,022 | 9/1996 | Dunstan et al. | 395/750 |
| 5,598,567 | 1/1997 | Ninomiya | 395/750 |
| 5,613,135 | 3/1997 | Sakai et al. | 395/800 |
| 5,640,176 | 6/1997 | Mundt et al. | 345/146 |

Primary Examiner—Jack B. Harvey
Assistant Examiner—Valerie Darbe
Attorney, Agent, or Firm—Robert E. Bushnell, Esq.

[57] ABSTRACT

An apparatus and method for displaying power management system (PMS) information in a portable computer includes a video random access memory (RAM) for storing the power management system (PMS) information as a preset data configuration. A keyboard controller outputs a signal corresponding to an operating state represented by a user key selection and a system interrupt signal. A power management system (PMS) controller outputs a corresponding signal after sensing a present charging/discharging state of the voltage of a battery. A real-time clock (RTC) stores data corresponding to the mode and level of the power management system (PMS) set during an initial set-up step of computer operation. A video controller reads the power management system (PMS) information stored in the video random access memory (RAM), and displays the information as a preset data configuration on a display unit when a corresponding key signal is output from the keyboard controller. A central processing unit (CPU) reads the present battery level from the power management system (PMS) controller, reads the mode and level of the power management system (PMS) stored in the real-time clock (RTC) when an interrupt signal is generated from the keyboard controller, and controls the operation of displaying the power management system (PMS) information.

14 Claims, 2 Drawing Sheets

APPARATUS AND METHOD FOR DISPLAYING PMS INFORMATION IN A PORTABLE COMPUTER

CROSS-REFERENCE TO RELATED APPLICATIONS

This application makes reference to, incorporates the same herein, and claims all benefits accruing under 35 U.S.C. §119 from an application for *Apparatus And Method For Displaying PMS Information In A Portable Computer* earlier filed in the Korean Industrial Property Office on 20 January 1995 and there assigned Ser. No. 980/1995.

BACKGROUND OF THE INVENTION

The present invention relates to an apparatus and method for displaying power management system (PMS) information in a portable computer. And more particularly, when a user manipulates designated keys, the present apparatus displays the present level and mode at which the power management system (PMS) is operating and the present battery capacity on a monitor or a liquid crystal display using a preset data configuration stored in an additional video chip.

Since portable computers are generally operated by a battery, power management systems (PMS) are used to enable the user to effectively realize the maximum battery capacity. A power management system (PMS) typically operates in a manner such that, when the computer remains in a power-on state for a predetermined period of time and does not receive an input from the user, the present work on the computer is stored in an auxiliary memory such as a hard disk, and the power is automatically turned off. When the power is turned on again, perhaps in response to a user input, the power management system (PMS) enables retrieval of the data stored in the auxiliary device before power was turned off. The power management system (PMS) is classified into various levels such that a user can control how power is supplied to the computer. The power management system (PMS) is operated according to an AC/DC enable mode, a DC enable mode, and a disable mode. During the AC/DC enable mode, the power management system (PMS) is operated when the computer receives power from an AC adaptor or a battery. During the DC enable mode, the power management system (PMS) is operated when the computer receives power from the battery, but is not operated when the computer receives power from the AC adapter. During the disable mode, the power management system (PMS) is not operated regardless of whether the computer receives power from the AC adapter or the battery. The various levels at which the power management system (PMS) operates can be designated by the user according to power management system (PMS) modes and states of computer use, to control the supply of power to the computer.

In the conventional art, a problem occurs in that power management system (PMS) information, such as the power management system (PMS) mode and level, can only be observed by the user during a set-up procedure of the computer. Moreover, in order to detect the present state of a battery, an additional utility program is often required.

One prior art reference directed towards monitoring the battery charge for a computer is disclosed in U.S. Pat. No. 5,345,392 entitled *Battery Charge Monitor For A Personal Computer* issued to Mito et al. In Mito et al. '392, the level of remaining battery energy is ascertained by utilizing a predetermined discharge table which is dependent upon battery temperature, voltage and current. While Mito et al. '392 provides the user with some indication of the remaining battery level, I believe that the conventional art can be improved to better provide the user with power management information and data.

SUMMARY OF THE INVENTION

Accordingly, it is an object of the present invention to provide an improved apparatus and method for displaying power management system (PMS) information in a portable computer.

It is another object to provide an apparatus and method for enabling display of power management system (PMS) information in a portable computer by providing a separate video memory in which the power management system (PMS) information is stored.

It is still another object to provide an apparatus and method for providing a user with a display of current power management system (PMS) information in response to one or more key inputs.

It is yet another object to provide an apparatus and method for enabling a user to enter new power management system (PMS) information in response to one or more key inputs.

It is still yet another object to provide an apparatus and method for a portable computer in which a central processing unit (CPU) stops performance of all current tasks and enables display of power management system (PMS) information in response to a system interrupt.

To achieve these and other objects, the present invention provides a video random access memory (RAM) for storing power management information comprised of data indicative of an operating mode and an operating level of a power management system (PMS) of the portable computer, data indicative of a remaining energy capacity of a battery used to provide operating power to the portable computer, and data indicative of whether the battery or an alternating current (AC) adapter is being used to provide operating power to the portable computer. A keyboard controller provides output of a key signal corresponding to a key input provided by a user and a system interrupt signal. A power management system (PMS) controller provides output of a voltage signal corresponding to a sensed voltage of the battery. A real-time clock (RTC) stores the data indicative of the operating mode and operating level of the power management system (PMS) at an initial set-up operation of the portable computer. A video controller reads the power management information from the video random access memory and enables display of the power management information as a preset data configuration on a monitor when the key board controller outputs the key signal to indicate that the user requests display of the power management information. A central processing unit (CPU), in response to the system interrupt signal provided from the key board controller, reads the voltage signal from the power management system (PMS) controller to detect the remaining energy capacity of the battery, reads the data indicative of the operating mode and operating level of the power management system (PMS) from the real-time clcock (RTC) and controls the video controller to enable the display of the power management system (PMS) information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
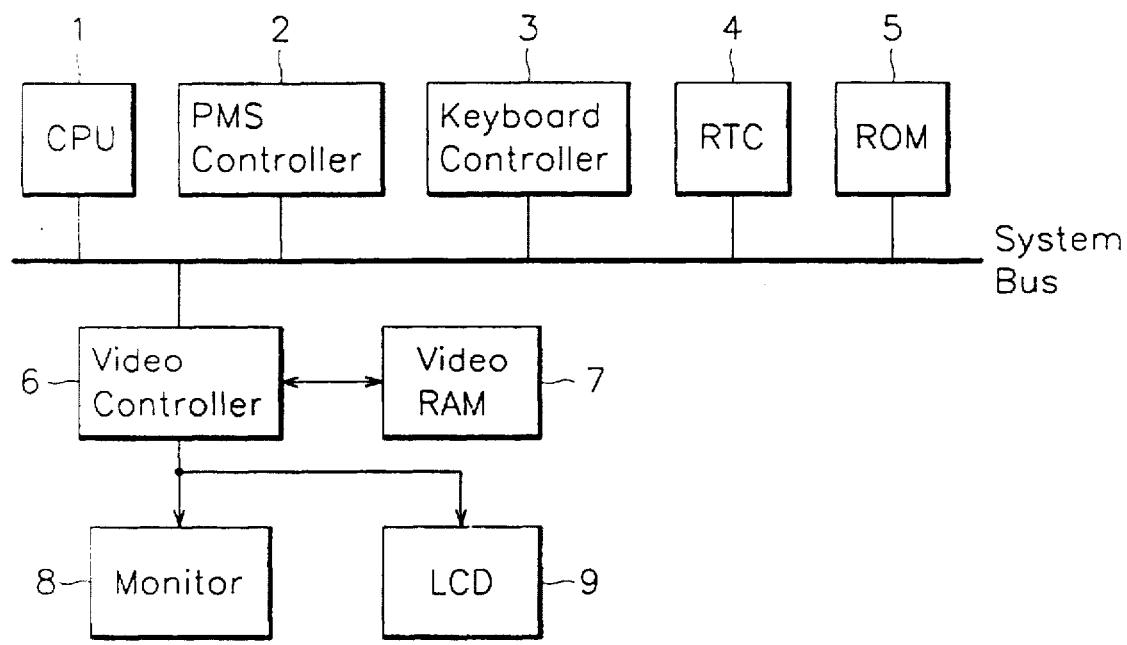
FIG. 1 is a block diagram of an apparatus for displaying power management system (PMS) information in a portable computer constructed as a preferred embodiment of the present invention.

Turning now to the drawings and referring to FIG. 1, a block diagram of an apparatus for displaying power management system (PMS) information in a portable computer constructed according to the principles of the present invention is shown. The apparatus of FIG. 1 includes a video random access memory (RAM) 7 for storing the power mangement system (PMS) information as a preset data configuration (i.e., hardware cursor). A keyboard controller 3 outputs a signal corresponding to an operating state indicated by a user key selection and a system interrupt signal. A power management system (PMS) controller 2 outputs a corresponding signal after sensing a present charging/discharging state of the voltage of a battery. A real-time clock (RTC) 4 stores data representative of a working environment (i.e., data corresponding to the mode and level of the power management system (PMS)) set during an initial set-up step of computer operation. A video controller 6 reads the power management system (PMS) information stored in video random access memory (RAM) 7, and displays the information as a preset data configuration on a monitor 8 when a corresponding key signal is output from keyboard controller 3. A central processing unit (CPU) 1 reads the present battery level from power management system (PMS) controller 2, reads the mode and level of the power management system (PMS) stored in real-time clock (RTC) 4 when an interrupt signal is generated from keyboard controller 3, and controls the operation of video controller 6 in displaying the power management system (PMS) information. A liquid crystal display (LCD) 9, rather than monitor 8, may be connected to an output terminal of video controller 6.

Generally, when shifting a cursor (e.g., using a mouse) in a windows software environment, a given amount of time is required for central processing unit (CPU) I to process an address and data according to the shifting of the cursor whenever the cursor moves. Accordingly, operating demands on central processing unit (CPU) 1 can adversely impact the performance of other processing functions.

To solve the software processing problem that occurs from shifting the cursor, a hardware cursor can be used by providing an additional video buffer for storing a preset data configuration corresponding to the hardware cursor. With this type of arrangement, the pattern or movement of the hardware cursor is controlled not by central processing unit (CPU) 1, but by video controller 6, thereby reducing the processing time constraints imposed on central processing unit (CPU) 1.

Central processing unit (CPU) 1 initializes all variables and devices once operating power is provided, and determines when a system management interrupt (SMI) is generated (S110).

When a user presses one or more predetermined keys on a keyboard to examine or change power management system (PMS) information, such as mode and level, according to the preferred embodiment of the present invention, the corresponding signal is provided to keyboard controller 3 from the keyboard. The predetermined keys on the keyboard may, for example, be designated as any of the function keys. If a user presses the predetermined keys and the corresponding signal is input to keyboard controller 3, keyboard controller 3 determines that a user has depressed the predetermined keys in order to examine or change the power management system (PMS) information. As a result, keyboard controller 3 outputs an interrupt signal to central processing unit (CPU) 1 to enable examination or change of the mode and level of the power management system (PMS). Once the interrupt signal is received from keyboard controller 3, central processing unit (CPU) 1 determines whether the power management system (PMS) information has been changed (S120), and enables display of the current power management system (PMS) information if no change has been indicated (S220). When the power management system (PMS) information has been changed, central processing unit (CPU) 1 stops its present operation and reads the mode and level of the power management system (PMS) which are stored in real-time clock (RTC) 4 (S130).

After reading the current mode and level of the power management system (PMS), central processing unit (CPU) 1 reads the present battery capacity from power management system (PMS) controller 2 (S140). Power management system (PMS) controller 2 outputs a corresponding electrical signal to central processing unit (CPU) 1 after sensing the present voltage of the battery. Central processing unit (CPU) 1 then outputs an enable signal and the read power management system (PMS) information modified according to user changes to drive video controller 6 (S150). Video controller 6 then enables display of the modified power management system (PMS) information stored in video random access memory (RAM) 7 on monitor 8 or liquid crystal display (LCD) 9, in the format shown in FIG. 2, in response to the enable signal output from central processing unit (CPU) 1 (S160).

Figure 2:
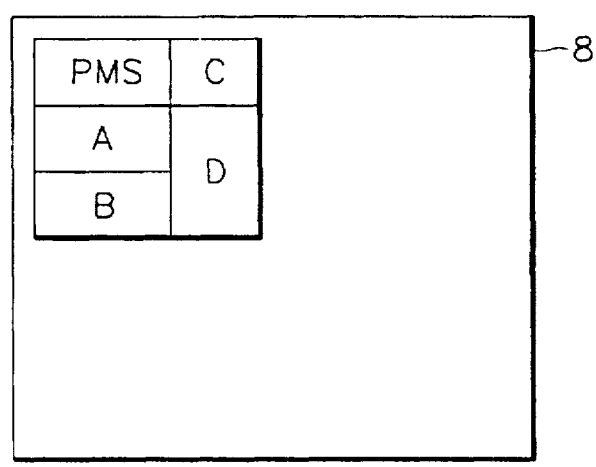
FIG. 2 is a view showing an arrangement for displaying power management system (PMS) information in a portable computer constructed as to the preferred embodiment of the present invention.
Figure 3:
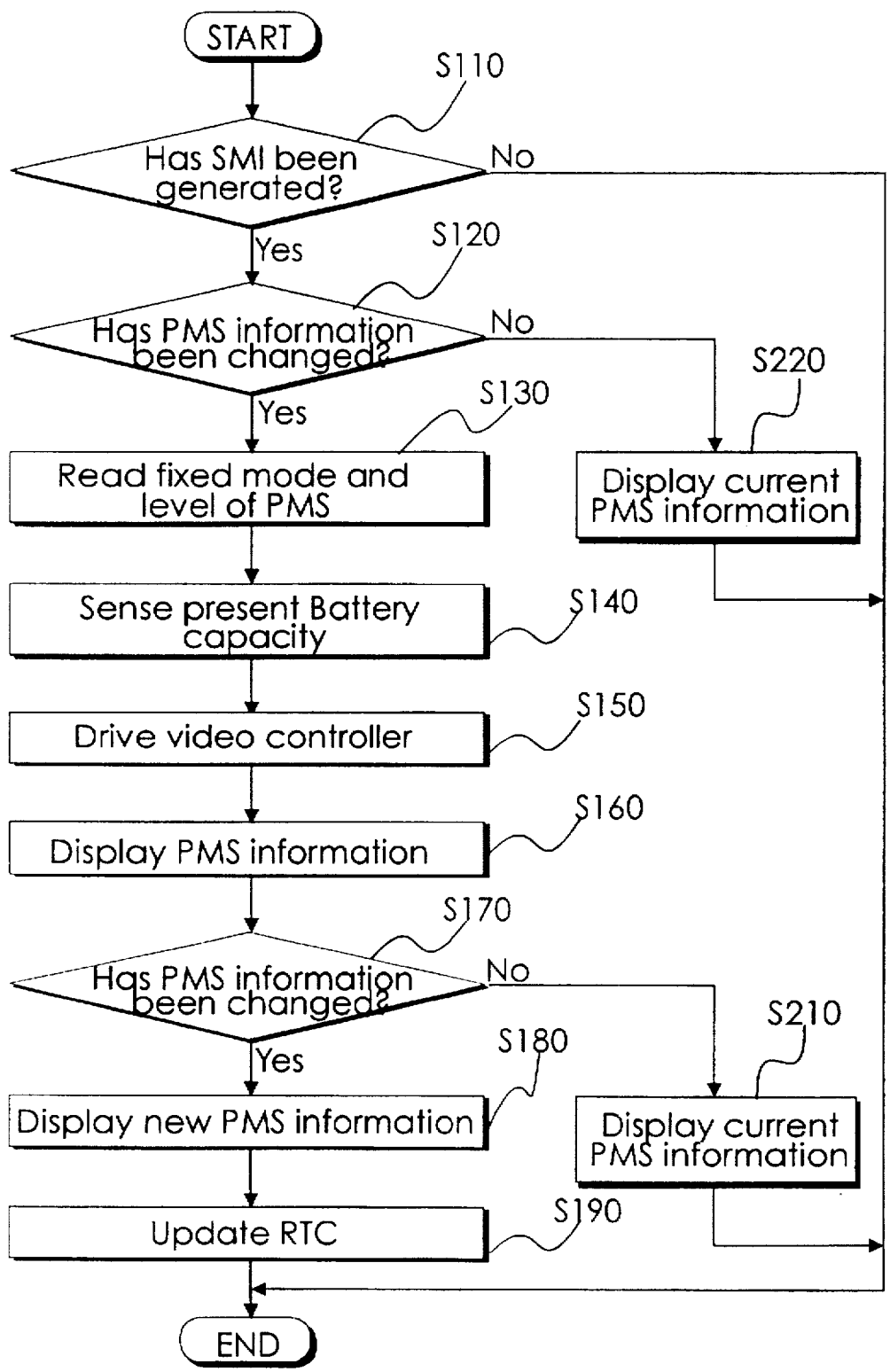
FIG. 3 is a flow chart showing the steps for displaying power management system (PMS) information in a portable computer constructed as the preferred embodiment of the present invention.

Referring now to FIG. 2, the power management system (PMS) information may be displayed as a preset data configuration (i.e., display region) on the upper-left portion of monitor 8. The display region may, for example, occupy an area (in pixels) of 64×64. As shown in FIG. 2, an item A within the preset data configuration displays whether the present power management system (PMS) mode is the direct current (DC) enable mode, the alternating current/direct current (AC-DC) enable mode, or the disable mode in which the power management system (PMS) is not operated. An item B displays the power management system (PMS) operational level according to the system (PMS) mode setting. An item C displays whether the power driving the computer is from a battery or an alternating current (AC) source. An item D displays the remaining battery capacity.

Central processing unit (CPU) 1 determines whether a user changes an item of information within the preset data configuration after video controller 6 enables display of the preset data configuration (S170). If no changes are made, the current power management system (PMS) information continues to be displayed (S210).

Once a user presses a first designated key to change the present power management system (PMS) mode displayed as item A on monitor 8, or presses a second designated key to change the power management system (PMS) level displayed as item B on monitor 8, keyboard controller 3 outputs a corresponding signal to central processing unit (CPU) 1. Central processing unit (CPU) 1 then transmits the changed data to video controller 6 when the signal for changing the mode and level of the power management system (PMS) is provided from keyboard controller 3.

Video controller 6 enables display of the new mode and level of the power management system (PMS) on monitor 8 in accordance with the data output from central processing unit (CPU) 1 (S180). During this operation, the data stored in real-time clock (RTC) 4 is updated to reflect the current status of the power management system (PMS) information (S190).

As described above, the preferred embodiment of the present invention provides an apparatus and a method for displaying power management system (PMS) information using a hardware cursor in a portable computer. Namely, if a user maniplates a key, the present invention allows a user to check and change a present mode and level of the power management system (PMS), and to control the power management system (PMS) more efficiently by displaying the present mode and level of the power management system (PMS) and the present capacity of a battery. According to the computer's state of use, power management system (PMS) information may be conveniently changed, and the life of the battery may be extended. In addition, the present invention utilizes a system management interrupt (SMI), rather than a normal interrupt, so that when the system management interrupt (SMI) is generated, central processing unit (CPU) 1 stops all existing operations and displays the power management system (PMS) information.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for displaying power management information in a portable computer having a main information display monitor, said apparatus comprising:

a video random access memory for storing said power management information comprised of data indicative of an operating mode and an operating level of a power management system of said portable computer, and data indicative of a remaining energy capacity of a battery used to provide operating power to said portable computer;

a keyboard controller for providing output of a key signal corresponding to a key input provided by a user, and further providing output of a system interrupt signal;

a power management system controller for providing output of a voltage signal corresponding to a sensed voltage of said battery;

storage means for storing said data indicative of said operating mode and said operating level of said power management system of said portable computer at an initial set-up operation of said portable computer;

a video controller for reading said power management information from said video random access memory and for enabling an on-screen display of said power management information as a preset data configuration on said main information display monitor in response to said key signal provided from said key board controller; and an operation controller for, in response to said system interrupt signal provided from said key board controller, reading said voltage signal from said power management system controller to detect said remaining energy capacity of said battery, reading said data indicative of said operating mode and said operating level of said power management system from said storage means, and controlling said video controller to enable the on-screen display of said power management information on said main information display monitor.

2. The apparatus of claim 1, further comprised of said operation controller transmitting data indicative of a modified operating mode and a modified operating level of said power management system to said video controller, and enabling an on-screen display of said modified operating mode and said modified operating level of said power management system on said main information display monitor in response to said key signal provided from said key board controller.

3. The apparatus of claim 1, wherein said power management information further comprises data indicative of whether one of said battery and an alternating current adapter is being used to provide the operating power to said portable computer.

4. The apparatus of claim 3, further comprised of said operation controller transmitting data indicative of a modified operating mode and a modified operating level of said power management system to said video controller, and enabling an on-screen display of said modified operating mode and said modified operating level of said power management system on said main information display monitor in response to said key signal provided from said key board controller.

5. A method for displaying power management information stored in a video random-access-memory of a portable computer having a main information display monitor, comprising the steps of:

performing an initializing operation in response to application of operating power to said portable computer;

determining when a system interrupt is generated after performing said initializing operation;

reading said power management information stored from said video random-access memory, said power management information comprising data indicative of an operating mode and an operating level of a power management system of said portable computer when said system interrupt indicates a key request by a user to provide an on-screen display of said power management information on said main information display monitor;

sensing a remaining energy capacity of a battery used to provide the operating power to said portable computer; and providing said on-screen display of said operating mode, said operating level and said remaining capacity of said battery on said main information display monitor of said portable computer as a preset data configuration.

6. The method of claim 5, further comprising a step of generating data indicative of a modified operating mode and a modified operating level of said power management system, and enabling an on-screen display of said modified operating mode and said modified operating level of said power management system on said main information display monitor in response to a user input.

7. The method of claim 5, further comprising a central processing unit of said portable computer for stopping existing operations to perform said reading, sensing and displaying steps, when said system interrupt indicates said request by the user to provide an on-screen display said power management information on said main information display monitor.

8. The method of claim 6, further comprising a central processing unit of said portable computer for stopping existing operations to perform said reading, sensing and displaying steps, when said system interrupt indicates said request by the user to provide an on-screen display said power management information on said main information display monitor.

9. The method of claim 5, wherein said displaying step further comprises displaying data indicative of whether one of said battery and an alternating current adapter is being used to provide the operating power to said portable computer.

10. The method of claim 5, wherein said operating mode of said power management system corresponds to one of an AC/DC enable mode for using the operating power from one of a battery and an alternating current adapter, a DC enable mode for using the operating power only from said battery, and a disable mode for cutting off the operating power from any one of said battery and said alternating current adapter.

11. The method of claim 9, wherein said operating mode of said power management system corresponds to one of an AC/DC enable mode for using the operating power from one of a battery and an alternating current adapter, a DC enable mode for using the operating power only from said battery, and a disable mode for cutting off the operating power from any one of said battery and said alternating current adapter.

12. A method for displaying power management information in a computer system having a main information display monitor, comprising the steps of:

receiving predetermined key inputs from a user requesting an on-screen display of said power management information first data indicative of an operating mode and an operating level of a power management system of said computer system, second data indicative of a remaining energy capacity of a battery used to provide operating power to said computer system, and third data indicative of whether one of said battery and an alternating current adapter is being used to provide the operating power to said computer system;

obtaining said first data from a first storing unit;

obtaining said second data by sensing a voltage level exhibited by said battery;

storing said power management information in a second storing unit; and providing said on-screen display of said power management information as a preset data configuration on said main information display monitor of said computer system.

13. The method of claim 12, further comprising a step of generating data indicative of a modified operating mode and a modified operating level of said power management system, and enabling an on-screen display of said modified operating mode and said modified operating level of said power management system on said main information display monitor in response to a user input.

14. The method of claim 12, wherein said operating mode of said power management system corresponds to one of an AC/DC enable mode for using the operating power from one of a battery and an alternating current adapter, a DC enable mode for using the operating power only from said battery, and a disable mode for cutting off the operating power from any one of said battery and said alternating current adapter.

* * * * *